US00RE36995E

United States Patent [19]

Andis

[11] E Patent Number: Re. 36,995

[45] **Reissued Date of Patent: *Dec. 26, 2000**

[54] HAND HELD APPLIANCE AND HOLDER ASSEMBLY

[75] Inventor: Matthew L. Andis, Racine, Wis.

[73] Assignee: Andis Company, Racine, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 08/882,665

[22] Filed: Jun. 25, 1997

Related U.S. Patent Documents

Reissue of:

[64] Patent No.: 5,590,475
Issued: Jan. 7, 1997
Appl. No.: 08/567,400
Filed: Dec. 5, 1995

U.S. Applications:

[63] Continuation of application No. 08/428,682, Apr. 25, 1995, abandoned.

[51] Int. Cl.[7] ..... A45D 20/00

[52] U.S. Cl. ..... 34/97; 34/90; 392/384

[58] Field of Search ..... 34/90, 91, 96–99, 34/283; 248/673, 674; 392/383, 384, 385, 370; 379/419, 433; D14/142

[56] References Cited

U.S. PATENT DOCUMENTS

| | | | |
|---|---|---|---|
| D. 102,955 | 1/1937 | Obergfell | D14/142 |
| D. 304,725 | 11/1989 | Rose | D14/142 |
| 3,964,708 | 6/1976 | Reeves | 248/126 |
| 4,493,975 | 1/1985 | Yamamoto | 219/370 |
| 4,659,907 | 4/1987 | Andis | 219/370 |
| 4,683,369 | 7/1987 | Rieckman et al. | 34/96 |
| 4,700,049 | 10/1987 | Rubin | 34/97 |
| 4,802,287 | 2/1989 | Chen | 34/90 |
| 4,835,879 | 6/1989 | Egelstad | 34/91 |
| 4,868,998 | 9/1989 | Rubin | 34/91 |
| 4,910,385 | 3/1990 | Shye-Long | 219/364 |
| 5,177,879 | 1/1993 | Muta | 34/90 |
| 5,590,475 | 1/1997 | Andis | 34/97 |

*Primary Examiner*—John T. Kwon
*Attorney, Agent, or Firm*—Michael Best & Freidrich LLP

[57] ABSTRACT

A hand held appliance and holder assembly comprising a holder including means adapted for mounting to a supporting surface, a first end portion, a second end portion, and a cradle portion intermediate the end portions, and a hand held appliance including a handle portion including an inner end, an outer end releasably engaged by one of the end portions, and an intermediate part located between the inner and outer ends, received in the cradle portion, and including an off-on switch including a member moveable between an off position and an on position and being displaceable to the off position incident to receipt of the intermediate part into the cradle portion, and an operating portion attached to the inner end of the handle portion and releasably engaged by the other of the end portions.

25 Claims, 3 Drawing Sheets

HAND HELD APPLIANCE AND HOLDER ASSEMBLY

Matter enclosed in heavy brackets [ ] appears in the original patent but forms no part of this reissue specification; matter printed in italics indicates the additions made by reissue.

This a continuation of application Ser. No. 08,428,682, filed Apr. 25, 1995, Entitled HAND HELD APPLIANCE AND HOLDER ASSEMBLY, now abandoned.

BACKGROUND OF THE INVENTION

The invention relates generally to arrangements for hanging an electrically operated hand held appliance, such as a hair dryer, in a holder mounted on a wall.

Attention is directed to U.S. Pat. 4,659,907, issued Apr. 31, 1987, and entitled Wall Mounted Device With Hand-Held Hair Dryer.

SUMMARY OF THE INVENTION

The invention provides a hand held appliance and holder assembly comprising a holder including means adapted for mounting to a supporting surface, a first end portion, a second end portion, and a cradle portion intermediate the end portions, and a hand held appliance including a handle portion including an inner end, an outer end releasably engaged by one of the end portions, and an intermediate part located between the inner and outer ends, received in the cradle portion, and including an off-on switch including a member moveable between an off position and an on position and being displaceable to the off position incident to receipt of the intermediate part into the cradle portion, and an operating portion attached to the inner end of the handle portion and releasably engaged by the other of the end portions.

The invention also provides a hand held appliance assembly comprising a holder which is of one-piece molded plastic construction and which includes a base portion, a first end portion comprising a shelf extending outwardly from the base portion, being resiliently movable relative thereto, and having therein a recess, a second end portion comprising a socket extending from the base portion and including, adjacent the outer margin thereof, a tab which is located in spaced, facing relation to the shelf, and a cradle which is located intermediate the end portions and which includes two spaced and facing surfaces, and means adapted for mounting to a surface, and a hand held hair dryer including a handle portion including an inner end, an outer end releasably engaged in the recess in the shelf, and an intermediate part located between the inner and outer ends, received in the cradle between the spaced surfaces, and including a front, a rear, two sides, and an off-on rocker type switch which is located on the front and which includes a member moveable between an off position located in outwardly extending relation to the front and an on position located in generally flush relation to the front and being displaceable to the off position incident to engagement with one of the spaced surfaces of the cradle during receipt of the intermediate part into the cradle, and a blower portion attached to the inner end of the handle portion, received in the socket, and releasably engaged by the tab.

The invention also provides a holder for a hand held appliance, which holder is of one-piece molded plastic construction and includes a base portion, a first end portion comprising a shelf extending outwardly from the base portion, being resiliently movable relative thereto, and having therein a recess adapted to receive the end of a handle portion of a hand held appliance, a second end portion comprising a socket extending from the base portion and including, adjacent the outer margin thereof, a tab which is located in spaced, facing relation to the shelf, which is resiliently moveable relative thereto, and which is adapted to engage another portion of the hand held appliance, a cradle which is located intermediate the end portions and which includes two spaced and facing surfaces, and which is adapted to receive the handle portion of the hand held appliance, and means adapted for mounting to a wall.

Other features and advantages of the invention will become apparent to those skilled in the art upon review of the following detailed description, claims and drawings.

Figure 2:
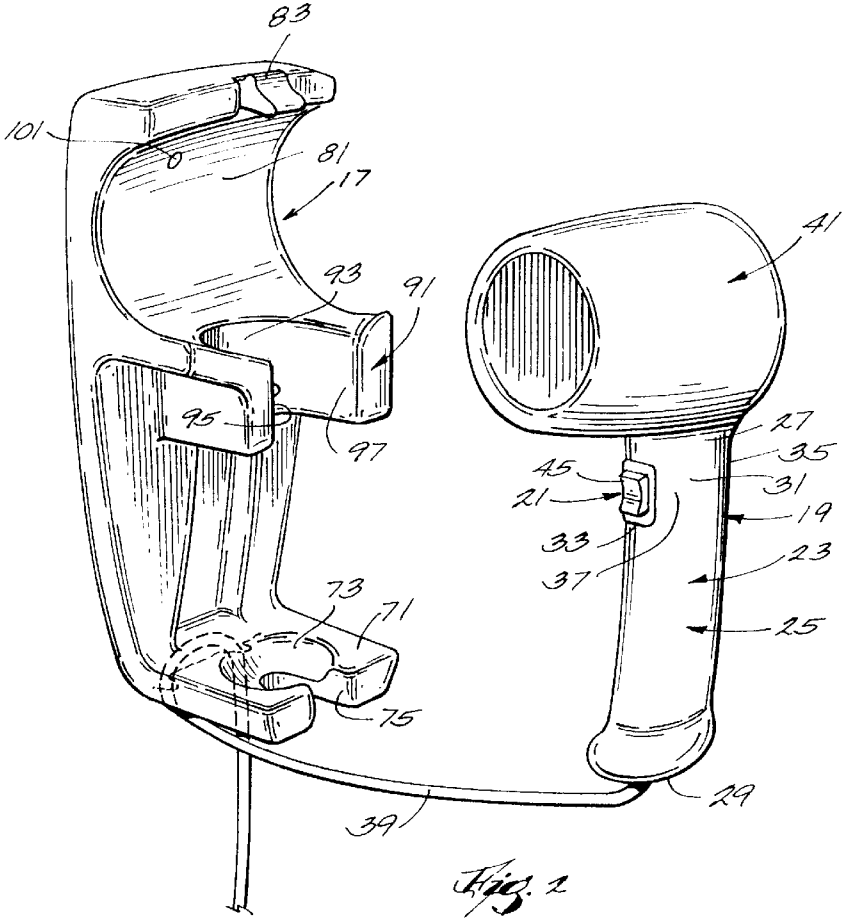
FIG. 2 is a view which is similar to FIG. 1 and which illustrates the hair dryer removed from the holder.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Figure 1:
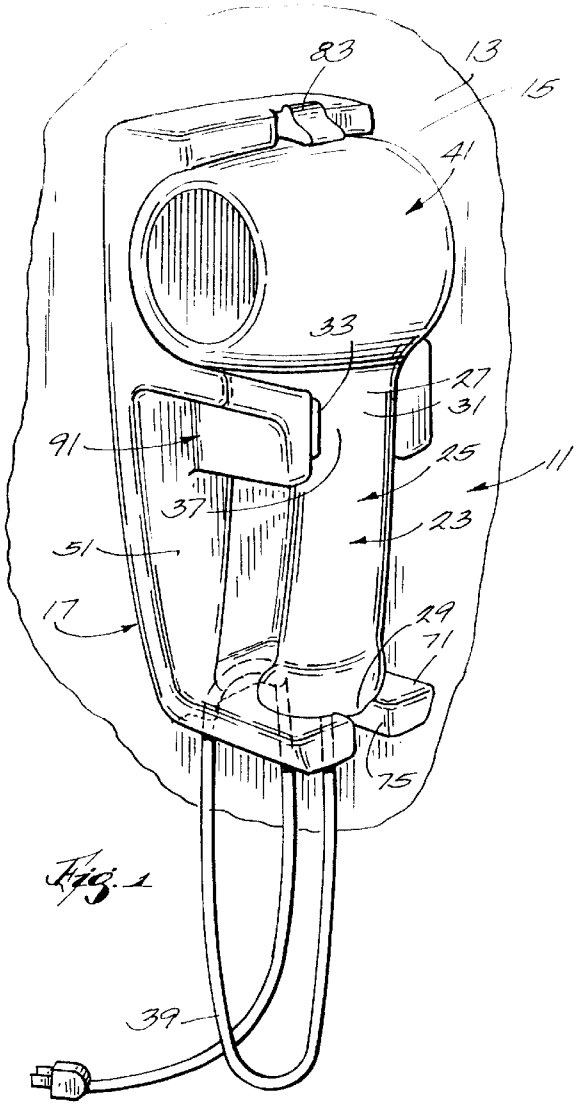
FIG. 1 is a perspective view of a hair dryer and holder assembly which embodies various of the features of the invention.

Shown in FIG. 1 of the drawings is a hand held appliance assembly 11 which includes a holder 17 and a hand held appliance 19 and which is adapted to be mounted or fixed on a supporting surface which can be either a vertical surface, such as a vertical wall, or a horizontal surface, such as a counter top or a table top. In the specifically disclosed construction, the holder 17 is shown fixed to to a vertically extending wall 13 having a mounting surface 15. The hand held appliance 19 is removably receivable in the holder 17 and includes an off on switch 21 (see FIG. 2) which can be operated between an on position when the appliance 19 is removed from the holder 17 and which, in response to replacement of the appliance 19 in the holder 17, is automatically operated to turn the switch 21 to the off position.

The holder 17 can be adapted to hold a wide variety of hand-held hair care appliances, such as hair curling irons, hair curling brushes, hot air-hair curlers, hair clippers, hair trimmers, and shavers. Such appliances can be either of the corded type or of the rechargeable battery powered cordless type. In the disclosed construction, the holder 17 is particularly adapted to removably receive and hold a hair dryer 23. Furthermore, various configurations of hair dryers can be employed.

In the disclosed construction, the hair dryer 23 includes a handle portion 25 which includes an inner end 27, an outer end 29, and an intermediate part 31 having a front 33, a rear 35, and two laterally spaced sides 37 (only one shown). Extending from the lower end of the handle portion 25 is an electrical cord 39 which, at the remote end thereof, includes a plug (not shown) which can be removably received in an electrical socket (not shown).

The hair dryer 23 also includes a blower portion 41 which includes a blower (not shown) and which is fixed to the inner end 27 of the handle portion 25. Any suitable construction can be employed for constructing the handle portion 25 and the blower portion 41.

Figure 4:
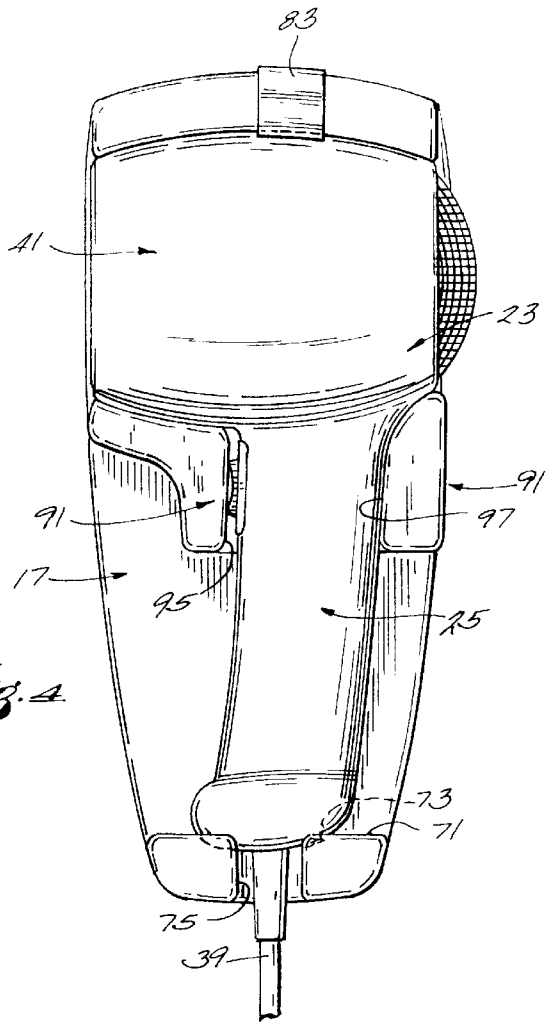
FIG. 4 is a front elevational view of the hair dryer and holder assembly shown in FIG. 1.
Figure 7:
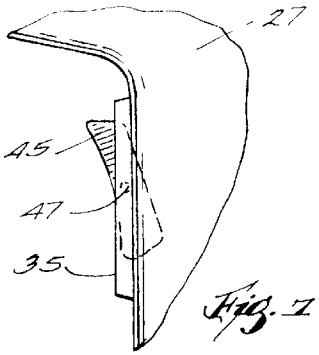
FIG. 7 is a an enlarged fragmentary view of a part of the hair dryer, which part includes an actuating switch having a switch member which is illustrated in the on position.
Figure 8:
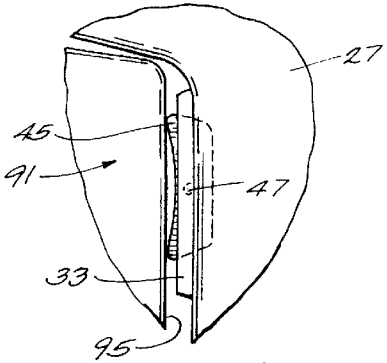
FIG. 8 is a view similar to FIG. 7, and illustrates the switch member in the off position when the hair dryer is in the holder.

Included in the intermediate part 31 of the handle portion 25 is the before mentioned off-on switch 21 which includes a moveable switch member 45 which is moveable between an off position and an on position. Various switch constructions can be employed in the disclosed construction, the switch 21 is of the over-center rocker type and the switch member 45 is moveable (see FIGS. 4 and 5) about an axis 47 extending generally in the direction between the inner and outer ends of the handle portion 25. When in the off position, the switch member 45 is located see FIG. 8) in generally flush relation to the front surface 33 of the intermediate part 31. When in the on position, the switch member 45 is located (see FIG. 7) in generally projecting relation to the front surface 33 of the intermediate part 31. In an alternate embodiment (not shown), the switch member can be located on the front of the intermediate part of the handle portion and arranged to slide between the off and on positions in the direction between the sides of the handle portion.

Figure 6:
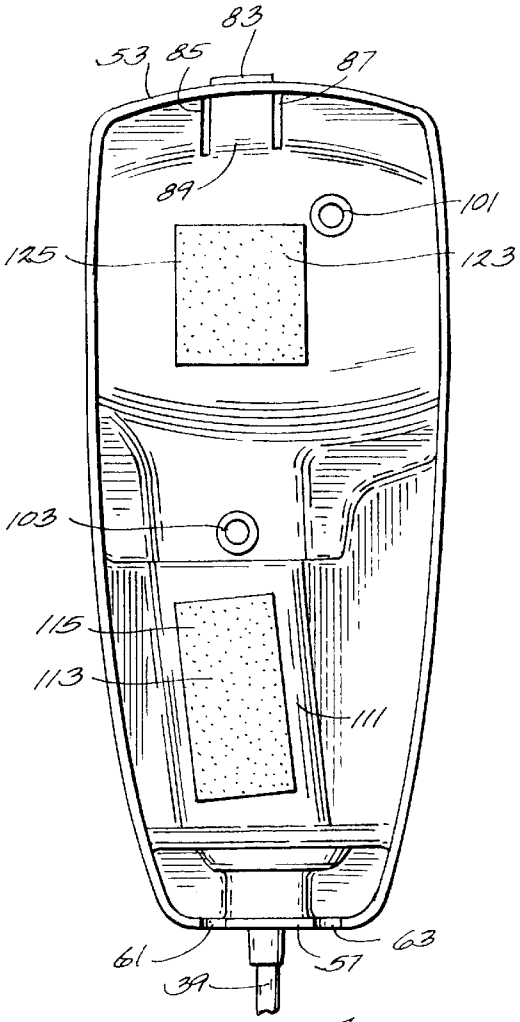
FIG. 6 is a rear elevational view of the hair dryer and holder assembly shown in FIG. 1.

The holder 17 is preferably fabricated or molded in one-piece from a plastic material which is resilient and, in general, includes (see FIG. 5) a peripheral base portion 51 which terminates in a rear edge or margin 53 lying in a rear plane 55 and, although other shapes can be employed, is generally rectangular in shape. The base portion 51 also includes (see FIG. 6), in a bottom wall part 57 thereof, a pair of forwardly extending and laterally spaced slots 61 and 63 which open rearwardly at the rear edge 53 and which afford passage therethrough of the electrical cord 39 of the hair dryer 23 so as to afford regulation and adjustment of the amount or cord length which extends to the hair dryer 23 from the holder 17.

The holder 17 also includes a lower shelf or shelf portion 71 which extends forwardly from the base portion 51 and includes a shallow recess 73 which is adapted to receive the outer or lower end 29 of the handle portion 25 of the hair dryer 23. The recess 73 communicates with a forwardly open slot 75 affording passage therethrough of the electrical cord 39 of the hair dryer 23.

The holder 17 also includes an upper socket or socket portion 81 which is dish or barrel shaped to receive the blower portion 41 of the hair dryer 23. At the upper margin thereof, the socket 81 includes a tab or lip 83 which extends forwardly therefrom and is adapted to engage and grip the top of the blower portion 41 to assist in retaining the hair dryer 23 in the holder 17. Preferably, the tab 83 is separated from the socket 81 (see FIG. 6) by a pair of vertically extending and laterally spaced slits 85 and 87 and is resiliently connected to the socket 81 along a generally horizontally extending living hinge 89 located at the inner ends of the slits 85 and 87. According, the tab 83 can resiliently move to and from a position releasably engaging and gripping the top of the blower portion 41 of the hair dryer 23. Alternately, the tab or lip can extend solidly from the socket 81.

The holder 17 also includes a cradle or cradle portion 91 which is located between the socket 81 and the shelf 71 and which includes, in addition to a bottom wall 93, a pair of laterally spaced walls or surfaces 95 and 97 which extend forwardly from the bottom wall 93 and are located to embrace the intermediate part 31 of the handle portion 25 of the hair dryer 23. As a consequence, when the switch member 45 is in the on position and the handle portion 25 is inserted between the spaced surfaces 95 and 97 of the cradle 91, the extending or projecting switch member 45 engages the surface 95 and is cammed to the off position wherein the switch member 45 is generally flush with the front 33 of the intermediate part 31 of the handle portion 25.

When a sliding switch member is employed as before mentioned, the surface 95 of the cradle 91 can be provided with a shoulder which extends in the direction between the inner and outer ends 27 and 29 of the handle portion 25 and which engages the sliding switch member to displace the switch member from the on position to the off position in response to insertion of the handle portion 25 into the cradle 91.

Figure 3:
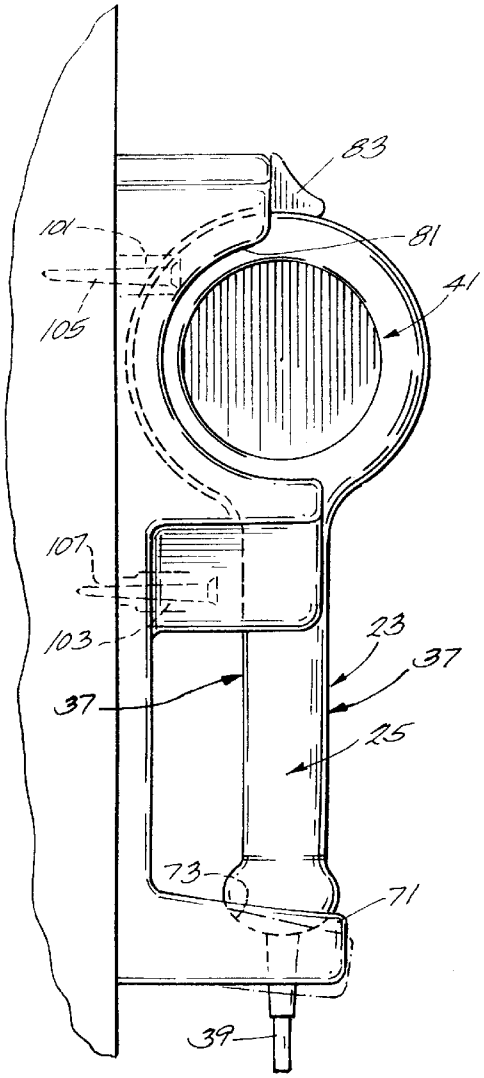
FIG. 3 is a side elevational view of the hair dryer and holder assembly shown in FIG. 1.

The holder 17 also includes means for attachment thereof to the wall surface 15. While various other arrangements can be used, in the disclosed construction, such means comprises, in one embodiment and as shown best in FIG. 3, a pair of spaced through holes 101 and 103 which extend perpendicularly relative to the rear plane 55 and which are adapted for passage therethrough of suitable screws 105 and 107 which can be threaded into the wall surface 15 to retain the holder 17 in place. While other arrangements can be employed, in the disclosed construction, the hole 101 extends from the socket 81 and the hole 103 extends from the cradle 91.

Figure 5:
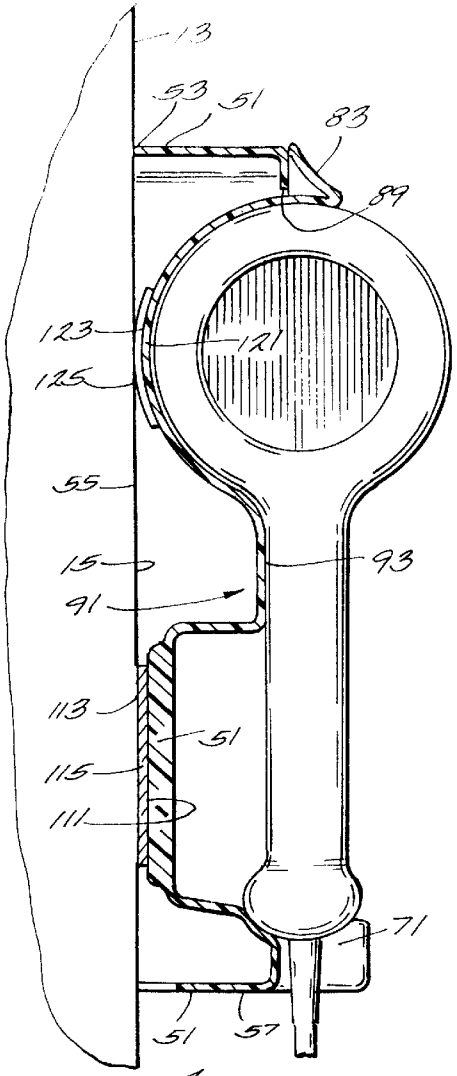
FIG. 5 is a sectional view taken along line 5—5 of Figure

In another attachment means embodiment, as shown best in FIG. 5, the base portion 51 includes a rear surface 111 which is generally planar and which is located in adjacent relation to the rear plane 55. Fixed on the rear surface 111 is an adhesive pad 113 which includes a removable tear off sheet (not shown) protecting the adhesive when not in use and which has an adhesive surface 115 located in the rear plane 55 and in position for adhesive attachment with the wall surface 15 to retain the holder 17 on the wall 13.

In addition the deepest part of the socket 81 includes a rear surface 121 having a portion located in adjacent relation to the rear plane 55. Fixed to this rear surface 121 is another adhesive pad 123 which includes a removable tear off sheet (not shown) protecting the adhesive and which has an adhesive surface 125 located in the rear plane 55 and in position for adhesive attachment with the wall surface 15 to retain the holder 17 on the wall 13.

In use, the appliance or hair dryer 23 can be located in the holder 17 by engaging the lower or outer end 29 of the handle portion 25 with the recess 73 in the shelf 71 and resiliently slightly depressing the shelf 71 to permit the top surface of the blower portion 41 to be engaged with the tab or lip 83 extending from the upper part of the socket 81 so as thereby to grip and retain the hair dryer 23 by the holder 17. In the event that the switch 21 was previously in the on position, such placement of the hair dryer 23 in the holder 17 will automatically displace the switch member 45 to the off position, as already explained.

To remove the hair dryer 23 from the holder 17, the hair dryer 23 is grasped and outwardly pulled from the retain grip of the shelf 71 and the tab 83. As a consequence, the shelf 71 (and the tab or lip 83) temporarily and resiliently deflects so as to permit removal of the hair dryer 23 from the holder 17. After such removal, the switch 21 can be activated to the on position to cause operation of the blower.

Various of the features of the invention are set forth in the following claims.

I claim:

1. A hand held appliance and holder assembly comprising a holder including means adapted for mounting to a supporting surface, a first end portion, a second end portion, and a cradle portion intermediate said end portions, and a hand held appliance including a handle portion including an inner end, an outer end engaged by one of said end portions, and an intermediate part located between said inner and outer ends, received in said cradle portion, and including an off-on switch including a member moveable between an off position and an on position and being displaceable to said off position incident to receipt of said intermediate part into said cradle portion, and an operating portion attached to said inner end of said handle portion and engaged by the other of said end portions.

2. An assembly in accordance with claim 1 wherein said hand held appliance is a hair dryer and wherein said operating portion is a blower portion.

3. An assembly in accordance with claim 1 wherein said switch comprises a rocker type switch and wherein said member extends outwardly from said intermediate part when in said off position.

4. An assembly in accordance with claim 1 wherein said intermediate part includes a front, a rear, and two sides, and wherein said switch is located on one of said front, said rear, and one of said sides.

5. An assembly in accordance with claim 1 wherein one of said end portions comprises a shelf and the other of said end portions comprises a socket.

6. An assembly in accordance with claim 5 wherein said holder includes a base portion and wherein said shelf extends outwardly from said base portion and has therein a recess receiving said end portion of said appliance.

7. An assembly in accordance with claim 6 wherein said socket includes, adjacent the outer margin thereof, a tab which is located in spaced, facing relation to said shelf, which is resiliently moveable relative thereto, and which engages said hand held appliance.

8. An assembly in accordance with claim 7 wherein said tab is connected to said socket portion along a hinge line and is separated from said socket portion by two spaced slits.

9. An assembly in accordance with claim 1 wherein one of said end portions comprises a socket including, adjacent the outer margin thereof, a tab which is resiliently moveable relative thereto, and which engages said hand held appliance.

10. An assembly in accordance with claim 9 wherein said tab is connected to said socket along a hinge line and is separated from said socket by two spaced slits.

11. An assembly in accordance with claim 1 wherein said holder includes an outer peripheral wall having a rear margin lying in a plane, and a back surface located adjacent said plane, and wherein said mounting means includes a pad secured to said back surface and having an outer adhesive surface located approximately in said plane.

12. An assembly in accordance with claim 1 wherein said mounting means comprises at least two through holes which are located in said holder and which are adapted to receive fasteners adapted to be fixed in the wall.

13. An assembly in accordance with claim 1 wherein said holder is of one-piece construction and is molded of plastic.

14. A hand held appliance and holder assembly comprising a holder which is of one-piece molded plastic construction and which includes a base portion, a first end portion comprising a shelf extending outwardly from said base portion, being resiliently movable relative thereto, and having therein a recess, a second end portion comprising a socket extending from said base portion and including, adjacent the outer margin thereof, a tab which is located in spaced, facing relation to said shelf, and a cradle which is located intermediate said end portions and which includes two spaced and facing surfaces, and means adapted for mounting to a surface, and a hand held hair dryer including a handle portion including an inner end, an outer end releasably engaged in said recess in said shelf, and an intermediate part located between said inner and outer ends, received in said cradle between said spaced surfaces, and including a front, a rear, two sides, and an off-on rocker type switch which is located on said front and which includes a member moveable between an off position located in [outwardly extending] *generally flush* relation to said front and an on position located in [generally flush] *outwardly extending* relation to said front and being displaceable to said off position incident to engagement with one of said spaced surfaces of said cradle during receipt of said intermediate part into said cradle, and a blower portion attached to said inner end of said handle portion, received in said socket, and releasably engaged by said tab.

15. An assembly in accordance with claim 14 wherein said tab is connected to said socket along a hinge line and is separated from said socket by two spaced slits.

16. An assembly in accordance with claim 14 wherein said holder includes an outer peripheral wall having a rear margin lying in a plane, and a back surface located adjacent said plane, and wherein said mounting means includes a pad secured to said back surface and having an outer adhesive surface located approximately in said plane.

17. An assembly in accordance with claim 14 wherein said mounting means comprises at least two through holes which are located in said holder and which are adapted to receive fasteners adapted to be fixed in the wall.

18. A holder for a hand held appliance, said holder being of one-piece molded plastic construction and including a base portion, a first end portion comprising a shelf extending outwardly from said base portion, being resiliently movable relative thereto, and having therein a recess adapted to receive the end of a handle portion of a hand held appliance, a second end portion comprising a socket extending from said base portion and including, adjacent the outer margin thereof, a tab which is located in spaced, facing relation to said shelf, which is resiliently moveable relative thereto, and which is adapted to engage another portion of the hand held appliance, a cradle which is located intermediate said end portions and which includes two spaced and facing surfaces, and which is adapted to receive the handle portion of the hand held appliance, and means adapted for mounting to a wall.

19. A holder in accordance with claim 18 wherein said holder includes an outer peripheral wall having a rear margin lying a plane, and a back surface located adjacent said plane, and wherein said mounting means includes a pad secured to said back surface and having an outer adhesive surface located approximately in said plane.

20. A holder in accordance with claim 18 wherein said mounting means comprises at least two through holes which are located in said holder and which are adapted to receive fasteners adapted to be fixed in the wall.

21. A hand held appliance and holder assembly comprising a holder including means adapted for mounting to a supporting surface, an end portion, and a cradle portion connected to said end portion, and a hand held appliance supportingly engaged by said holder and including a handle portion including an outer end part engaged by said end portion, and an inner part extending from said end part, received in said cradle portion, and including an off-on switch including a member moveable between an off position and an on position and being displaceable to said off position incident to receipt of said inner part into said cradle portion, and an operating portion attached to said handle portion remotely from said outer end.

*22. A hand held appliance and holder assembly comprising a holder adapted for mounting to a supporting surface and including a cradle portion, and a hand held appliance supportingly engaged by said holder and including a handle portion including a handle part received in said cradle portion and including an off-on switch including a member moveable between an off position and an on position and being displaceable to said off position incident to receipt of said handle part into said cradle portion.*

*23. A hand held appliance and holder assembly comprising a holder adapted for mounting to a supporting surface and including a cradle portion, and an end portion extending from said cradle portion, and a hand held appliance supportingly engaged by said holder and including a handle portion including a handle including an intermediate part receivable in said cradle portion, an off-on switch including a member moveable between an off position and an on position and being displaceable to said off position incident to receipt of said handle part into said cradle portion, and including an end part extending from said intermediate part and having a recess receiving said end portion of said holder.*

*24. A hand held appliance and holder assembly comprising a hand held appliance including a handle portion having an end, a switch part including an off-on switch having a member moveable between an off position and an on position, and a blower portion attached to said handle portion, and a holder adapted for mounting to a supporting surface, supportingly receiving said hand held appliance, and including a cradle portion receiving said switch part of said handle portion and being operative to displace said off-on switch to said off position incident to receipt of said switch part of said handle portion into said cradle portion, and an end portion extending from said cradle portion and engaging said end of said hand held appliance.*

*25. A hand held appliance and holder assembly comprising a holder adapted for mounting to a supporting surface and including supporting structure adapted to receive a hand held appliance having a handle portion including an off-on switch including a member moveable between an off position and an on position and being displaceable to said off position incident to engagement of said handle portion by said supporting structure.*

* * * * *